US008849788B2

United States Patent
Kang et al.

(10) Patent No.: US 8,849,788 B2
(45) Date of Patent: Sep. 30, 2014

(54) METHOD FOR DETERMINING OPTIMAL CONNECTABLE ROUTE TO TARGET PERSON BASED ON MUTUAL INTIMACY INDEX

(75) Inventors: Yong-Ho Kang, Daejeon (KR); Se-Jin Nam, Daejeon (KR)

(73) Assignee: R2Soft Co., Ltd., Daejeon (KR)

( * ) Notice: Subject to any disclaimer, the term of this patent is extended or adjusted under 35 U.S.C. 154(b) by 0 days.

(21) Appl. No.: 13/478,658

(22) Filed: May 23, 2012

(65) Prior Publication Data

US 2012/0303658 A1 Nov. 29, 2012

(30) Foreign Application Priority Data

May 25, 2011 (KR) ........................ 10-2011-0049371

(51) Int. Cl.
*G06F 17/30* (2006.01)
*G06Q 10/04* (2012.01)
(52) U.S. Cl.
CPC .................................. *G06Q 10/047* (2013.01)
USPC ........................................ 707/706; 707/707
(58) Field of Classification Search
USPC ................................................ 707/706, 707
See application file for complete search history.

(56) References Cited

U.S. PATENT DOCUMENTS

| | | | | |
|---|---|---|---|---|
| 7,460,217 B2 * | 12/2008 | Beyrard | ........................ | 356/128 |
| 7,742,643 B2 * | 6/2010 | Yang et al. | .................... | 382/232 |
| 7,978,923 B2 * | 7/2011 | Yang et al. | .................... | 382/245 |
| 8,374,449 B2 * | 2/2013 | Yang et al. | .................... | 382/245 |
| 8,542,940 B2 * | 9/2013 | Yang et al. | .................... | 382/251 |
| 2006/0013493 A1 * | 1/2006 | Yang et al. | .................... | 382/232 |
| 2007/0085999 A1 * | 4/2007 | Beyrard | ........................ | 356/134 |
| 2009/0006197 A1 * | 1/2009 | Marcuvitz | ........................ | 705/14 |
| 2010/0181721 A1 * | 7/2010 | Janicek et al. | ................ | 273/243 |
| 2010/0272373 A1 * | 10/2010 | Yang et al. | .................... | 382/245 |
| 2010/0312714 A1 * | 12/2010 | Ourega | ........................ | 705/319 |
| 2011/0208822 A1 * | 8/2011 | Rathod | ........................ | 709/206 |
| 2011/0252340 A1 * | 10/2011 | Thomas | ........................ | 715/756 |
| 2012/0014615 A1 * | 1/2012 | Yang et al. | .................... | 382/251 |
| 2012/0233197 A1 * | 9/2012 | Tsai et al. | .................... | 707/769 |
| 2012/0284336 A1 * | 11/2012 | Schmidt et al. | ............. | 709/204 |
| 2013/0028533 A1 * | 1/2013 | Yang et al. | .................... | 382/251 |

* cited by examiner

*Primary Examiner* — Baoquoc N To
(74) *Attorney, Agent, or Firm* — IPLA P.A.; James E. Bame (57) ABSTRACT

Disclosed is a method for determining an optical connectable route to a target person based on a mutual intimacy index in that, when a specific member searches a route capable of connecting with a desiring target person though his acquaintance stored in his address book, it can determine an optical connectable route having a high mutual intimacy index between brokers as few broker as possible, by using the intimacy information of acquaintance lists stored in the address books of each member.

3 Claims, 6 Drawing Sheets

| KANG, Yong-Ho | basic information |
|---|---|

| name | basic information | intimacy information |
|---|---|---|
| KANG, Won | contact/others | kinship(5)<br>intimacy(48) |
| KANG, Seok | contact/others | kinship(5)<br>intimacy(26) |
| WOO, Wang-Don | contact/others | acquaintance(5)<br>intimacy(240) |
| CHOI, Ui-In | contact/others | acquaintance(5)<br>intimacy(101) |
| PARK, Jung-Hoon | contact/others | school relations(5)<br>intimacy(15) |
| NAM, Se-Jin | contact/others | school relations(5)<br>intimacy(88) |
| JANG, Dong-Gun | contact/others | acquaintance(2)<br>intimacy(15) |
| HONG, Yun-Taek | contact/others | : |
| KIM, Yong-Tae | contact/others | : |
| LEE, Hyun-Soo | contact/others | : |
| KIM, Seong-Hyun | contact/others | : |
| : | : | : |
| : | : | : |
| : | : | : |

| WOO, Wang-Don | basic information |
|---|---|

| name | basic information | intimacy information | other information |
|---|---|---|---|
| KIM, Tae-Hee | contact/others | acquaintance(1)<br>intimacy(12) | work<br>(Actress) |
| RYU, Wong-Sang | contact/others | acquaintance(3)<br>intimacy(15) | : |
| JANG, Jong-Hoon | contact/others | acquaintance(3)<br>intimacy(99) | : |
| KIM, Yu-Na | contact/others | acquaintance(4)<br>intimacy(49) | work<br>(national team) |
| A | contact/others | : | : |
| B | contact/others | : | : |

| KANG, Min-Gyu | basic information |
|---|---|

| name | basic information | intimacy information | other information |
|---|---|---|---|
| KANG, Won | : | : | : |
| KANG, Seon-Gyu | : | : | : |
| SEO, Yun-Joo | : | : | : |
| KANG, Yong-Ho | : | : | : |

FIG. 6

| NAM, Se-Jin | basic information |
|---|---|

| name | basic information | intimacy information | other information |
|---|---|---|---|
| JANG, Hyun-Cheol | : | acquaintance(5) intimacy(66) . | : |
| RYU, Hyun-Jin | : | acquaintance(5) intimacy(108) . | : |
| NAM, Hyo-Jin | : | kinship(5) intimacy(78) . | : |
|  |  |  |  |
|  |  |  |  |
|  |  |  |  |

| HONG, Gil-Dong | basic information |
|---|---|

| name | basic information | intimacy information | other information |
|---|---|---|---|
| KIM, Gil-Dong |  | kinship(4) intimacy(29) . |  |
| PARK, Jung-Hoon |  | acquaintance(3) intimacy(41) . |  |
| LEE, So-Ra |  | acquaintance(1) intimacy(33) . |  |
| KIM, Beom-Jun |  | acquaintance(3) intimacy(59) . |  |
|  |  |  |  |
|  |  |  |  |

| Obama | basic information |
|---|---|

| name | basic information | intimacy information | other information |
|---|---|---|---|
| WOO, Wang-Don |  | acquaintance(3) intimacy(43) . |  |
| Clinton |  | acquaintance(2) intimacy(21) . |  |
|  |  |  |  |
|  |  |  |  |

| JANG, Dong-Gun | basic information |
|---|---|

| name | basic information | intimacy information | other information |
|---|---|---|---|
|  |  |  | : |
|  |  |  | : |
|  |  |  | : |
|  |  |  | : |

| LIM, Kuk-Jung | basic information |
|---|---|

| name | basic information | intimacy information | other information |
|---|---|---|---|
| CHOI, Ui-In |  | acquaintance(3) intimacy(81) . |  |
| KANG, Gam-Chan |  |  |  |
| LEE, Soon-Shin |  |  |  |
| KIM, Gil-Dong |  | kinship(4) intimacy(94) . |  |
| KIM, Ui-Jeok |  |  |  |
| OH, San-Jeok |  |  |  |

| Chaplin | basic information |
|---|---|

| name | basic information | intimacy information | other information |
|---|---|---|---|
| KIM, Yu-Na |  | acquaintance(3) intimacy(49) . |  |
| RYU, Hyun-Jin |  | acquaintance(4) intimacy(95) . |  |
|  |  |  |  |
|  |  |  |  |
|  |  |  |  |
|  |  |  |  |

METHOD FOR DETERMINING OPTIMAL CONNECTABLE ROUTE TO TARGET PERSON BASED ON MUTUAL INTIMACY INDEX

CROSS REFERENCES

Applicant claims foreign priority under Paris Convention to Korean Patent Application No. 10-2011-0049371 filed May 25, 2011, with the Korean Intellectual Property Office, where the entire contents are incorporated herein by reference.

BACKGROUND OF THE INVENTION

1. Field of the Invention

The present invention relates to a method for determining an optical connectable route to a target person based on a mutual intimacy index, and more particularly to a method for determining an optical connectable route to a target person based on a mutual intimacy index in that, when a specific member searches a route capable of connecting with a desiring target person though his acquaintance stored in his address book, it can determine an optical connectable route having a high mutual intimacy index between brokers as few broker as possible, by using the intimacy information of acquaintance lists stored in the address books of each member.

2. Description of the Prior Art

Generally, the individual human relationship much depends on the address book in which the information of the acquaintances is stored. Recently, the users, who manage the acquaintance by sharing its own information and address etc. with the others forming the social relationship on the internet, are increased. Generally, the Internet service providers such as 'Cyworld' and 'Myspace' provide a simple human relationship service of providing the connection relation between the subscribers based on the human relations which are organized by the subscribers.

Through these conventional social network services, it is possible to make new personal connections with the new humans, in that there was no relationship, based on the common acquaintances. However, where some person wants to introduce a specific target person to himself though his acquaintance, there is a problems in that he can ensure labors of relaying the connections only by trial and error. Where he is connected to the target person through several steps that is, complicated routes, not one step, there is no method of knowing it immediately. Also, as though he finds out the connectable route with the target person in a hard, there is no guarantee that he has a good chance at success and the method thereof is more efficiently. That is, since there is a focus on the presence of the brokers capable of becoming the simple connecting contacts to search it, the degree of the mutual intimacy is not considered.

In the meantime, there are techniques of expressing the degree of the intimacy with the acquaintances stored in the address book. That is, Koran patent registration No. 10-566985 (title: mobile communication terminal having a calling time displaying function per an address database and controlling method therefore) relates to a technique in that the calling time and frequency per each address book are calculated to be stored and the accumulated calling time and frequency of the corresponding address can be displayed within a certain period of time, if the user request the search on the specific address. However, the conventional art discloses a just technology of disclosing the degree of the intimacy based on one or two factors such as the calling time and frequency and so on. However, since it does not disclose the method of calculating the degree of the intimacy based on various factors between the user and his acquaintances, actually, there is a problem in that the degree of the mutual intimacy of the close friend can be calculated low.

SUMMARY OF THE INVENTION

Accordingly, the present invention has been made to solve the above-mentioned problems occurring in the prior art, and an object of the present invention is to provide a method for determining an optical connectable route to a target person based on a mutual intimacy index in that, when a specific member wants to search a route capable of connecting with a desiring target person though his acquaintance stored in his address book, it can determine an optical connectable route having a high mutual intimacy index between brokers as few broker as possible, by using the intimacy information of acquaintance lists stored in the address books of each member.

An another object of the present invention is to provide a method for determining an optical connectable route to a target person based on a mutual intimacy index in that it can confirm a mutual intimacy index of his acquaintances, thereby efficiently operating and managing the address book.

To accomplish the object, the present invention provides a method for determining an optical connectable route to a target person based on a mutual intimacy index using an address book information of members provided by Internet service providers comprising: an address book build-up step of building up an address book DB server comprising an intimacy information of the acquaintances, who are in the human relations of each member having a static relationship information defined by a blood relation, a regional relation and a school relation between the member and his acquaintance and a communication relationship information illustrating a frequency of the social activity thereof, and a mutual intimacy index calculated by the intimacy information; a target person input step of receiving a desiring target person from a specific member; a route search step of searching and finding out connectable routes between the specific member and the target person; and a route determining step of determining and outputting an optical connectable route among the connectable routes in the light of the mutual intimacy index calculated by the intimacy information and the number of relay steps between the specific member and the target person all together, wherein, in the route determining step, the optical route is determined in that an unit mutual intimacy index, which is a value of dividing the intimacy index by the number of the relay steps between the specific member and the target person, is highest, when there are lots of connectable routes.

Preferably, the communication relationship information is any information of showing the frequency of the social activity thereof by communication factor capable of exactly measuring it as a communication number communicating through an internet between the member and his acquaintance.

Preferably, in the route determining step, the optical route is determined in that the number of the relay steps between the specific member and the target person is the lowest, when there are lots of connectable routes and the optical route is determined in that the total intimacy index of adding up the mutual intimacy indexes of each step is highest when there are lots of the lowest routes in terms of the number of the relay steps between the specific member and the target person.

BRIEF DESCRIPTION OF THE DRAWINGS

The above as well as the other objects, features and advantages of the present invention will be more apparent from the following detailed description taken in conjunction with the accompanying drawings, in which.

DETAILED DESCRIPTION OF THE EXEMPLARY EMBODIMENTS

Hereinafter, preferred embodiments of the present invention will be described with reference to the accompanying drawings.

Figure 1:
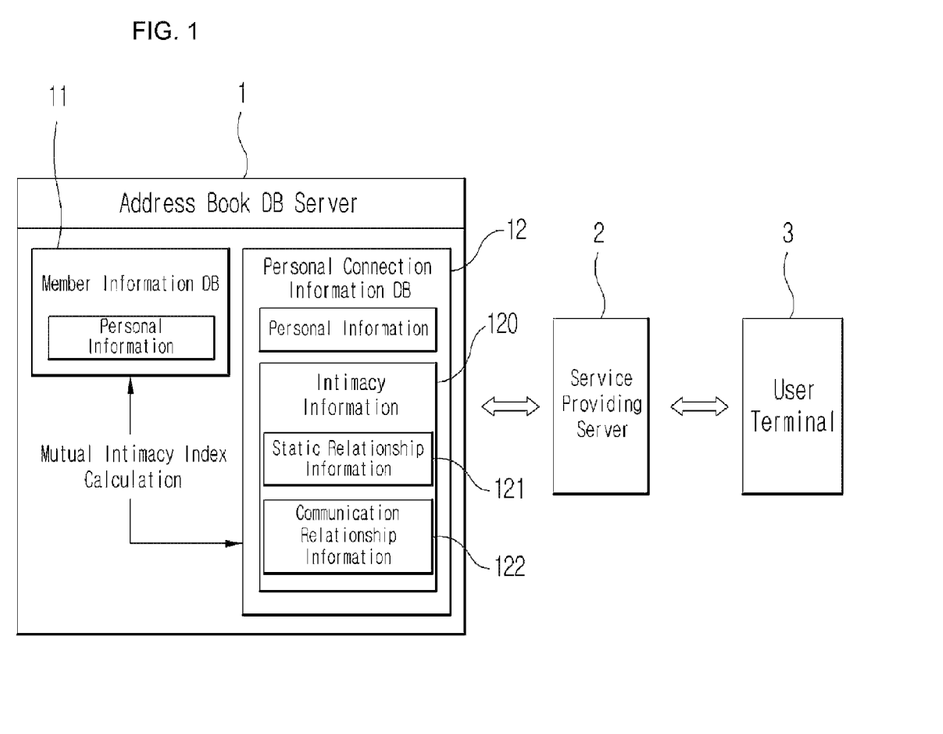
FIG. 1 is a block diagram illustrating a system for determining an optical connectable route to a target person based on a mutual intimacy index according to the present invention.

FIG. 1 is a block diagram illustrating a system for determining an optical connectable route to a target person based on a mutual intimacy index according to the present invention.

Referring to FIG. 1, the system for determining the optical connectable route to the target person based on the mutual intimacy index according to the present invention includes an address book DB server 1, a service providing server 2, and an user terminal 3.

The address book DB server 1 includes a member information database 11 and a personal connection information DB 12. In the member information database 11, a profile information of the member is stored. The profile information of the member includes a general membership joining information such as a name, a contact information, an address, an office information, an e-mail address etc. and an additional information directly inputted by the members as necessary. In the personal connection information DB 12, the information of the acquaintances, who are in the human relations of each member, is stored. The information of the acquaintances includes a personal information such as a name, a office, a contact information etc. provided to the name card in general and an intimacy information 120 on the personal connection relations between the member and the corresponding acquaintance. At this time, it is preferably that the intimacy information 120 includes a static relationship information 121 defined by a blood relation (Kinship), a regional relation (Regionalism), and a school relation between the member and his acquaintances and a communication relationship information 122 illustrating a frequency of the social activity thereof.

The communication relationship information 122 is any information of showing the frequency of the social activity thereof capable of exactly measuring the occurrence number by communication factor. The social activity is any activity such as an e-mail through an Internet, a message, a messenger dialogue, a search, and a schedule (meeting) etc. between the member and the acquaintance thereof. Also, the number of occurrence can be directly measured by the member. However, actually it is not easy for the member to input the corresponding details in real time while being interchanged between the member and the acquaintances thereof in a variety of ways. Accordingly, it is preferably that the measurement and the input of the social activity are updated in real time through the direct interconnection among the address book DB server 1, a social network service (SNS), and communications programs.

In the meantime, by using the intimacy information 120, it is possible to calculate the mutual intimacy index between the member and the specific acquaintance. The mutual intimacy index can be graded on the degree of the human relations between the member and his acquaintance. Preferably, the mutual intimacy index can be calculated by means of an equation in that it has been graded through the blood relation, the regional relation and the school relation between them in the static relationship information 121 and the measured values of the frequency of the social activity thereof by each activity details in the communication relationship information 122 are variable. The standard of dividing the grade and the score in the static relationship information 121 is illustrated in the following table 1.

TABLE 1

| Classification | Grade | Score |
|---|---|---|
| Kinship | 1~2 degree | 5 |
|  | 3~4 degree | 4 |
|  | 5~6 degree | 3 |
|  | 7~8 degree. | 2 |
|  | more than 9 degree | 1 |
| School relations | Duplication | 5 |
|  | Graduate school | 4 |
|  | University | 3 |
|  | Middle school | 2 |
|  | Elementary school | 1 |
| Regionalism | Very familiar | 5 |
|  | Familiar | 4 |
|  | Common | 3 |
|  | Subnormal | 2 |
|  | Mere acquaintance | 1 |

Figure 5:
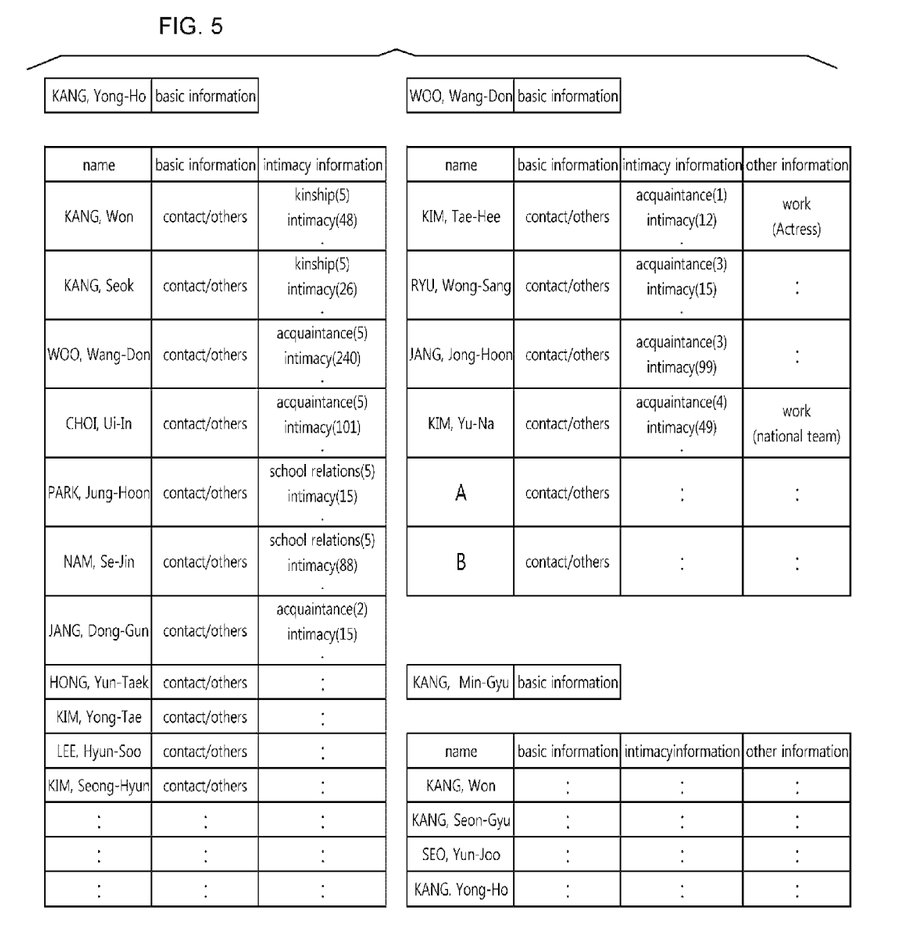
FIGS. 5 and 6 are exemplary views showing personal connection data base according to the present invention.

Also, according to the classification standard of the above table 1, the mutual intimacy index between the member "KANG, Yong-Ho" and his acquaintance "WOO, Wang-Don" existed in the member list and the acquaintance list of FIG. 5 can be calculated by the following manner.

Mutual intimacy index (member and his acquaintance) =static relationship index (member and his acquaintance)×communication relationship index (member and his acquaintance).

Standard of judgment: relationship between the member "KANG, Yong-Ho" and his acquaintance "WOO, Wang-Don" (it is considerably familiar) and the exchange activity (the number of e-mail: 12, the number of meeting: 16, and the number of message: 20).

Static relationship index (the member "KANG, Yong-Ho" and his acquaintance "WOO, Wang-Don")=5 points.

Communication relationship index (the member "KANG, Yong-Ho" and his acquaintance "WOO, Wang-Don") =12+16+20=48 points.

Mutual intimacy index (the member "KANG, Yong-Ho" and his acquaintance "WOO, Wang-Don")=5×48=240 points.

According to the mutual intimacy index calculated by the above manner, the member can figure out the human relation between himself and his acquaintances just at a glance. Accordingly, he can efficiently conduct the human relationship management.

Figure 2:
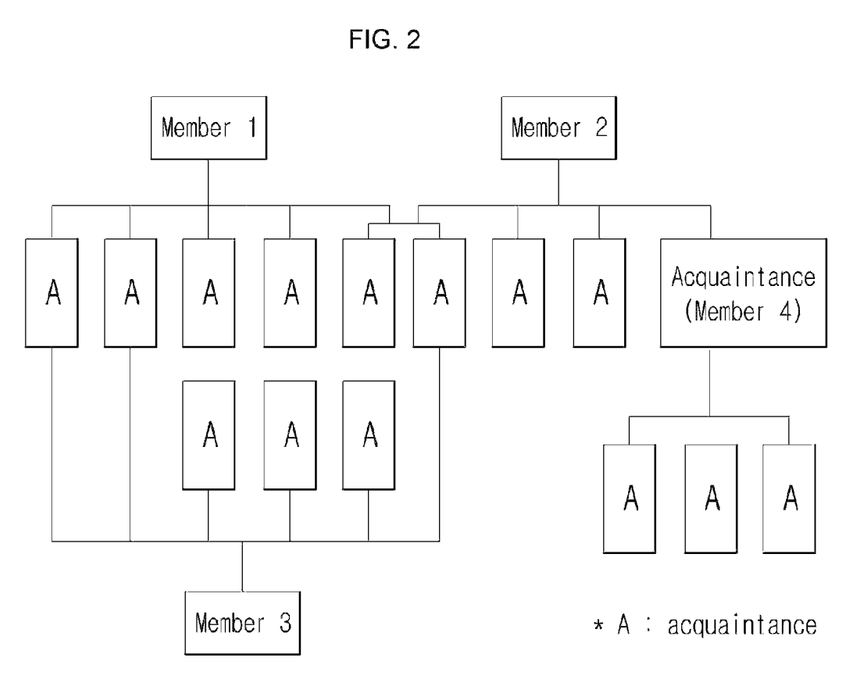
FIG. 2 is a block diagram illustrating a tree structure of personal connections of a member of a system according to the present invention.

FIG. 2 is a block diagram illustrating a tree structure of personal connections of a member of a system according to the present invention.

Referring to FIG. 2, in the system for determining the optical connectable route to the target person based on the mutual intimacy index according to the present invention, there are overlapping acquaintances between the acquaintance lists of each member and other members. Also, the member can be included in the acquaintance lists of other members. In the system according the present invention, in order to find out the desiring connection method of the specific member, it is important to find the overlapping acquaintances of playing a role as a medium (broker) between the connection structures. The method of searching the connection method will be concretely explained in FIG. 3 and FIG. 4 below.

Figure 3:
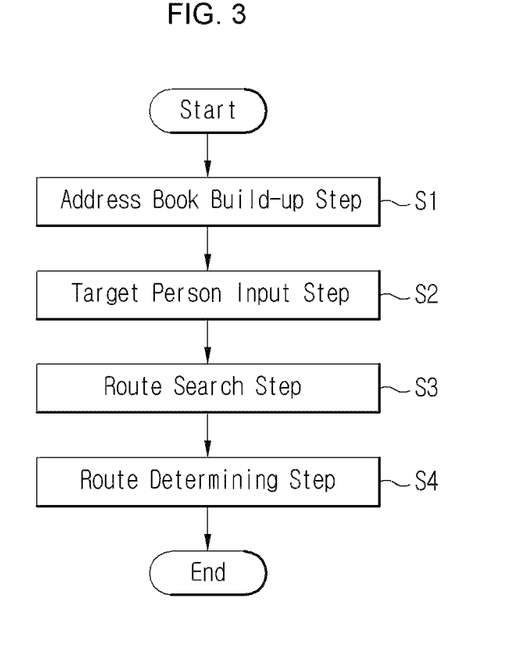
FIG. 3 is a flow chart illustrating a method for determining an optical connectable route to a target person based on a mutual intimacy index according to the present invention.

FIG. 3 is a flow chart illustrating a method for determining an optical connectable route to a target person based on a mutual intimacy index according to the present invention.

Referring to FIG. 3, the method for determining an optical connectable route to a target person based on a mutual intimacy index according to the present invention includes four steps. That is, the method according to the present invention includes an address book build-up step (S1) of building up an address book DB server 1 including an intimacy information 120 of the acquaintances, who are in the human relations of each member, a target person input step (S2) of receiving a desiring target person from a specific member, a route search step (S3) of searching and finding out connectable routes between the specific member and the target person, and a route determining step (S4) of determining and outputting an optical connectable route among the connectable routes in the light of the mutual intimacy index calculated by the intimacy information 120 and the number of relay steps between the specific member and the target person together.

The address book build-up step (S1) is any step of building up the address book DB server 1 including the member information database 11 and the personal connection information DB 12. At this time, as described above, in order to automatically update the communication relationship information 122, it is preferred that the address book DB server 1 can be directly linked to the network program based on Internet.

The target person input step (S2) is any step of receiving the desiring target person, whom the specific member intends to connect to, from himself. It can be inputted through an input means of the user terminal 3 connected to the service providing server 2. At this time, the member can wirelessly utilize the system of the present invention by means of the portable user terminal 3 with no bounds on place.

The route search step (S3) is any step of searching and finding out the connectable routes capable of connecting with the target person by searching the member lists and the acquaintance list stored in the address book DB server 1. Here, where the target person is existed in the member list of the member information database 11 or only the acquaintance list of the personal connection information DB 12, it is preferred that there is need to search the connectable routes in a different way respectively. The concrete searching method on this will be described in FIG. 4 below. Through the route search step (S3), it shows whether the specific member can be connected to his target person or not. Also, where the member is connected to his target person, it is possible to draw all routes.

The route determining step (S4) is any step of determining and outputting the optical connectable route among the connectable routes in the light of the mutual intimacy index calculated by the intimacy information 120 and the number of relay steps between the specific member and the target person together. Where there are lots of connectable routes, it should determine the optical connectable route, which is a little chance to fail the connection, most efficiently. At this time, in the determination of the optical connectable route, the factors to consider are two elements including the mutual intimacy index and the relay steps on the entire steps of the connectable routes. If the degree of the mutual intimacy is high, the success probability of the connection can be raised. The fewer the brokers, the better the connection between them.

In one embodiment of the method of determining the optical connectable route in the light of two elements together, it must determine any route in that the number of the relay steps between the specific member and the target person is the lowest. At this time, where there are lots of the lowest routes, it should determine the optical route in that the total mutual intimacy index of adding up the mutual intimacy indexes of each step is highest. It can preferentially consider the efficiency of the connection for rapid connection thereof.

In another embodiment of the method of determining the optical connectable route in the light of two elements together, it must determine any optical route in that the unit mutual intimacy index is highest. Here, the unit mutual intimacy index can be any value of dividing the intimacy index by the number of the relay steps between the specific member and the target person. As though the connectable route is connected through the brokers having a high degree of the mutual intimacy, if it is connected through many relay steps, the routes are inefficient. Also, as though it is connected through few relay steps, if the degree of the mutual intimacy between the connecting persons is low in each step, the routes have a high chance of failing to connect. Therefore, in order that it determines whether it is connected through the broker having an average degree of the intimacy by each step of the connectable route, it is preferred that the optical connectable route should be determined based on the unit mutual intimacy index.

Figure 4:
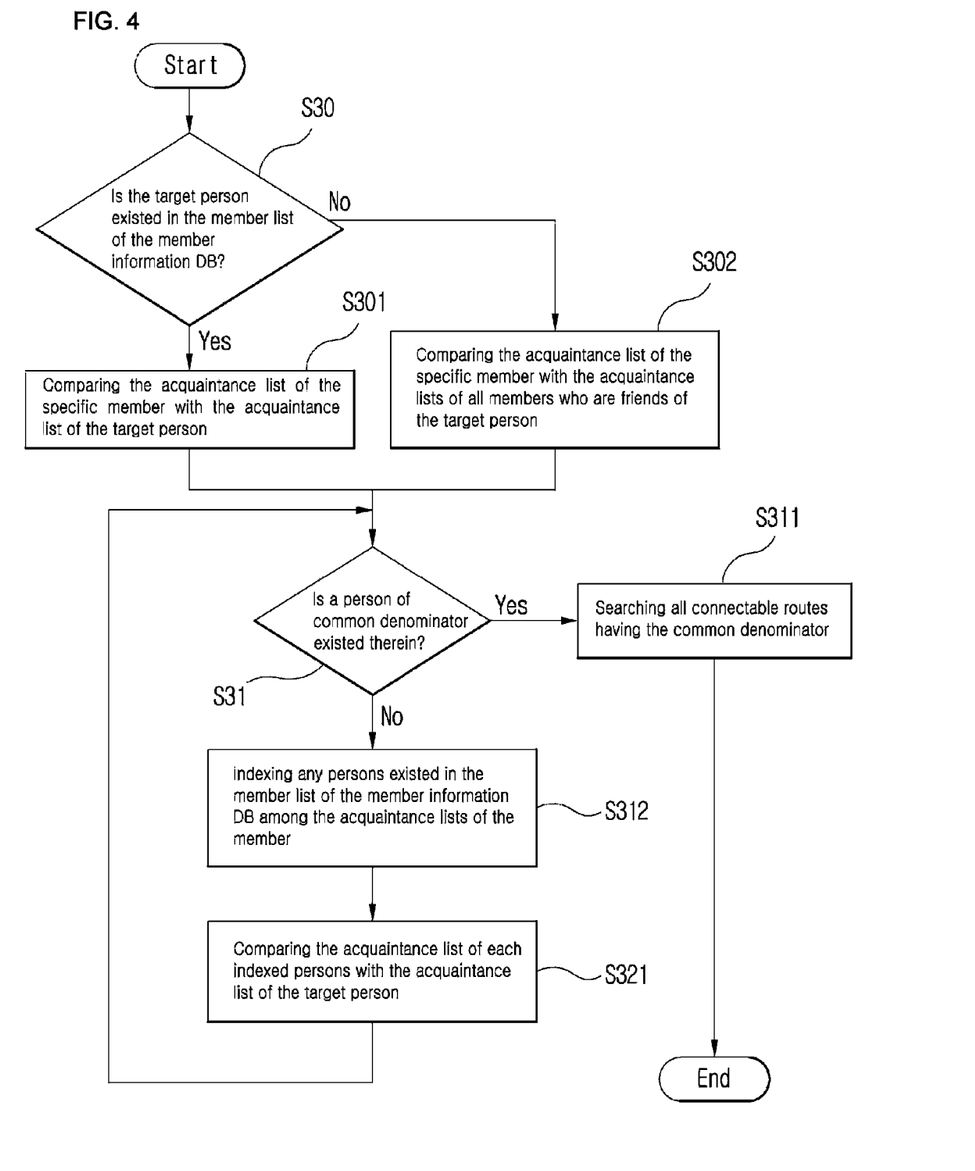
FIG. 4 is a detail flow chart of the route search step according to the present invention.

FIG. 4 is a detail flow chart of the route search step according to the present invention.

Referring to FIG. 4, where the desiring target person is existed in the member list of the member information database 11 or only the acquaintance list of the personal connection information DB 12, it is preferred that there is need to search the connectable routes in a different way respectively.

Where the target person is existed in the member list of the member information database 11, firstly it compares the acquaintance list of the specific member with the acquaintance list of the target person (S301) and then, it finds a person of common denominator between them (S31). When the person of common denominator is existed therein, the person of common denominator becomes the broker, thereby constitute the connectable route (1 step) (S311).

When the person of common denominator is not existed therein, it indexes any persons existed in the member list among the acquaintances existed in the acquaintance list of the specific member (S312). Then, it compares the acquaintance list of each indexed persons with the acquaintance list of the target person (S321) and then, it finds a person of common denominator between them (S31). When the person of common denominator is existed therein, any person having the acquaintances of the person of common denominator among the indexed persons and the person of common denominator become the broker, thereby constitute the connectable route (2 steps) (S311).

When the person of common denominator is not existed therein, it indexes any persons existed in the member list among the acquaintances existed in each acquaintance list of the indexed persons (S312). It can repeatedly and continuously search the connectable route (more than 3 steps) through the above steps.

Figure 6:
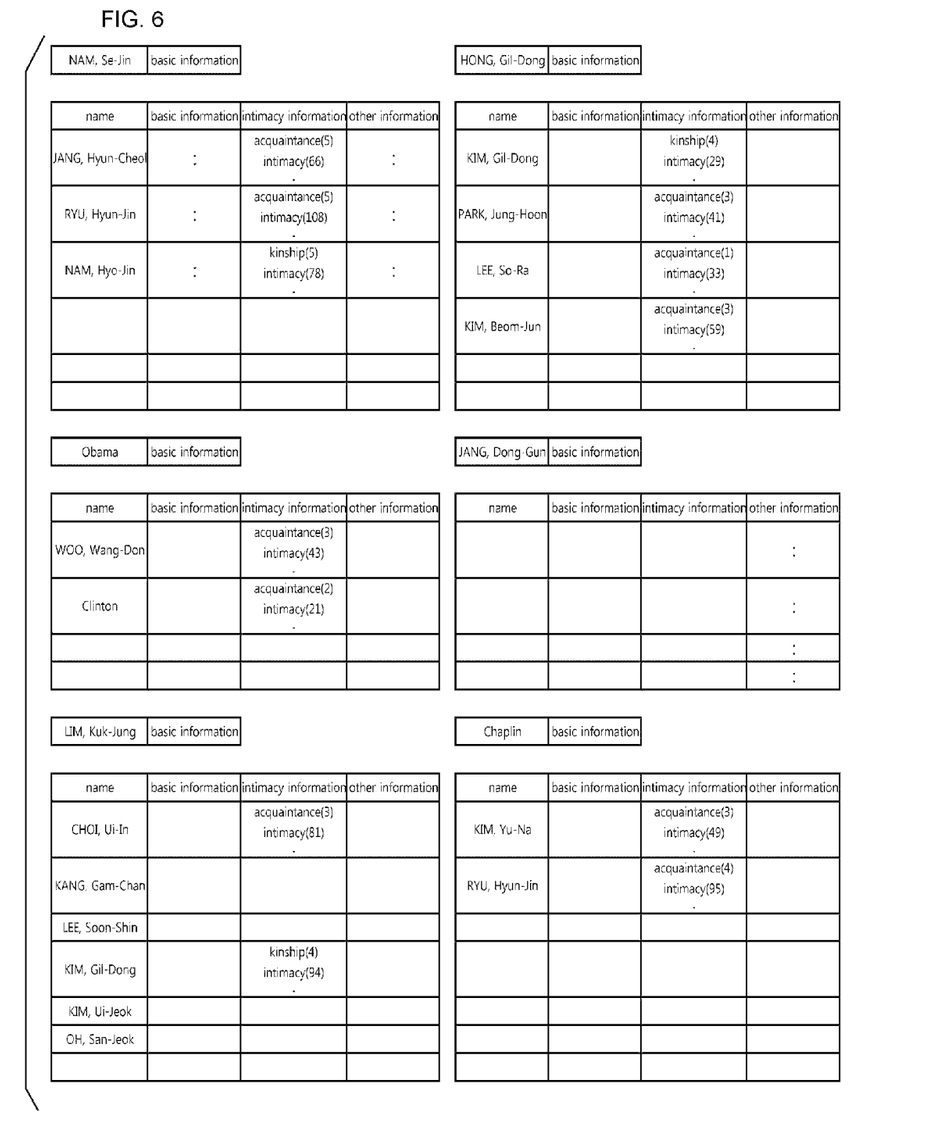

According to the route searching method, the desirable example for searching the connectable route among "KANG, Yong-Ho", "Obama", and "Chaplin" existed in the member list of FIG. 5 and FIG. 6 is as follows.

1. When the connectable route between the member "KANG, Yong-Ho" and "Obama" is searched.
   it confirms "Obama" existed in the member list of the member information DB 11
   it compares the acquaintance list of "KANG, Yong-Ho" with the acquaintance list of "Obama" and then, it finds "WOO, Wang-Don" who is the person of common denominator.
   it draws the connectable route (1 step) in that "WOO, Wang-Don" becomes the broker.
(KANG, Yong-Ho)-(WOO, Wang-Don)-(Obama)

2. When the connectable route between the member "KANG, Yong-Ho" and "Chaplin" is searched.
   it confirms "Chaplin" existed in the member list of the member information DB 11
   it compares the acquaintance list of "KANG, Yong-Ho" with the acquaintance list of "Chaplin" and then, confirms that the person of common denominator is not existed therein.
   it indexes "WOO, Wang-Don", "NAM, Se-Jin", and "JANG, Dong-Gun" existed in the member list existed in the acquaintance list of "KANG, Yong-Ho".
   it compares each acquaintance list of the indexed "WOO, Wang-Don", "NAM, Se-Jin", and "JANG, Dong-Gun" with the acquaintance list of "Chaplin" and then, it confirms that "KIM, Yu-Na" contained in the acquaintance list of "WOO, Wang-Don" is existed in the acquaintance list of "Chaplin" and "RYU, Hyun-Jin" contained in the acquaintance list of "NAM, Se-Jin" is existed in the acquaintance list of "Chaplin" (confirming the person of common denominator).
   it draws the connectable route (2 steps) in that "KIM, Yu-Na" and "NAM, Se-Jin" become the broker.
(KANG, Yong-Ho)-(WOO, Wang-Don)-(KIM, Yu-Na)-(Chaplin)
(KANG,Yong-Ho)-(NAM, Se-Jin)-(RYU, Hyun-Jin)-(Chaplin)

In the meantime, where the target person is existed in the acquaintance list of the personal connection information DB 12, firstly it compares the acquaintance list of the specific member with the acquaintance lists of all members, who are friends of the target person (S302), and then, it finds a person of common denominator between them (S31). When the person of common denominator is existed therein, any person having the acquaintances of the person of common denominator among all members, who are friends of the target person, and the person of common denominator become the broker, thereby constitute the connectable route (2 steps) (S311).

When the person of common denominator is not existed therein, it indexes any persons existed in the member list among the acquaintances existed in the acquaintance list of the specific member (S312). Then, it compares the acquaintance list of each indexed persons with the acquaintance list of all members, who are friends of the target person (S312), and then, it finds a person of common denominator between them (S31). When the person of common denominator is existed therein, any person having the acquaintances of the person of common denominator among the indexed persons, any person having the acquaintances of the person of common denominator among all members, who are friends of the target person, and the person of common denominator become the broker, thereby constitute the connectable route (3 steps) (S311).

When the person of common denominator is not existed therein, it indexes any persons existed in the member list among the acquaintances existed in each acquaintance list of the indexed persons (S312). It can repeatedly and continuously search the connectable route (more than 4 steps) through the above steps.

According to the route searching method, the desirable example for searching the connectable route between "KANG, Yong-Ho" and "KIM, Gil-dong" existed in the member list of FIG. 5 and FIG. 6 is as follows.

3. When the connectable route between the member "KANG, Yong-Ho" and "KIM, Gil-Dong" is searched.
   it confirms "KIM, Gil-Dong" existed in only the acquaintance list of the personal connection information DB 12.
   it confirms the members "HONG, Gil-Dong" and "LIM, Kuk-Jung" who are friends of "KIM, Gil-Dong".
   it compares the acquaintance list of "KANG, Yong-Ho" with the acquaintance list of "HONG, Gil-Dong" and then, it finds "PARK, Jeong-Hoon" who is the person of common denominator. Also, it compares the acquaintance list of "KANG, Yong-Ho" with the acquaintance list of "LIM, Kuk-Jung" and then, it finds "CHOI, Ui-In" who is the person of common denominator
   it draws the connectable route (2 steps) in that "PARK, Jeong-Hoon" and "CHOI, Ui-In" become the broker.
(KANG, Yong-Ho)-(PARK, Jeong-Hoon)-(HONG, Gil-Dong)-(KIM, Gil-Dong)
(KANG, Yong-Ho)-(CHOI, Ui-In)-(LIM, Kuk-Jung)-(KIM, Gil-Dong)

Also, in the route search step, where the desiring target person is existed in the member list of the member information database 11 and the acquaintance list of the personal connection information DB 12 at the same time, it can choose any one of the above two methods or it can perform two methods all together so as to search all connectable routes.

While this invention has been described in connection with what are presently considered to be the most practical and preferred embodiments, it is to be understood that the invention is not limited to the disclosed embodiments and the drawings, but, on the contrary, it is intended to cover various modifications and variations within the spirit and scope of the appended claims.

What is claimed is:

1. A method for determining an optimal connectable route to a target person based on a mutual intimacy index using an address book information of members provided by Internet service providers comprising:
    an address book build-up step of building up an address book DB server comprising a profile information of the member including a name, a contact information, an address, an office information, an e-mail address, and additional information inputted directly by the member and an intimacy information of the acquaintances, who are in the human relations of each member having a static relationship information defined by a blood relation, a original-hometown regional relation and a school alumni relation between the member and his acquaintance and a dynamic relationship information illustrating a frequency of a social activity thereof, and a mutual intimacy index calculated by the intimacy information;

a target person input step of receiving a desiring target person from a specific member;

a route search step of searching and finding out connectable routes between the specific member and the target person; and a route determining step of determining and outputting an optimal connectable route among the connectable routes in the light of the mutual intimacy index and the number of relay steps between the specific member and the target person all together, wherein, in the route determining step, when there are lots of connectable routes, the optimal route is determined by a connectable route for which a unit mutual intimacy index, which is obtained by dividing the mutual intimacy index by the number of the relay steps between the specific member and the target person, is highest.

2. The method as claimed in claim 1, wherein the dynamic relationship information is any information of showing the frequency of the social activity thereof by communication factor capable of exactly measuring it as a communication number communicating through an internet between the member and his acquaintance.

3. The method as claimed in claim 1, wherein, in the route determining step, when there are lots of connectable routes the optimal route is determined by a connectable route for which the number of the relay steps between the specific member and the target person is the lowest, and when there are lots of the lowest routes in terms of the number of the relay steps between the specific member and the target person the optimal route is determined by a connectable route for which the total intimacy index of adding up the mutual intimacy indexes of each step is highest.

* * * * *